Aug. 17, 1937.　　　　R. C. SHOCK　　　2,090,488
FLUID COOLED TUYERE CONSTRUCTION
Filed Aug. 4, 1934　　5 Sheets-Sheet 1

WITNESSES:  
E. Lutz  
James Mosser

INVENTOR  
ROLAND C. SHOCK.  
BY a. B. Reavi  
ATTORNEY

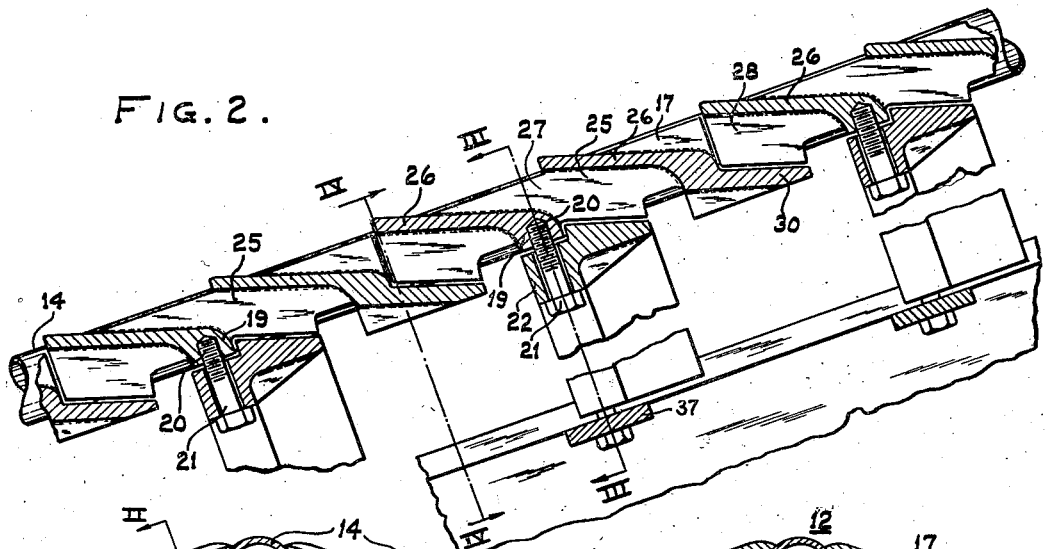
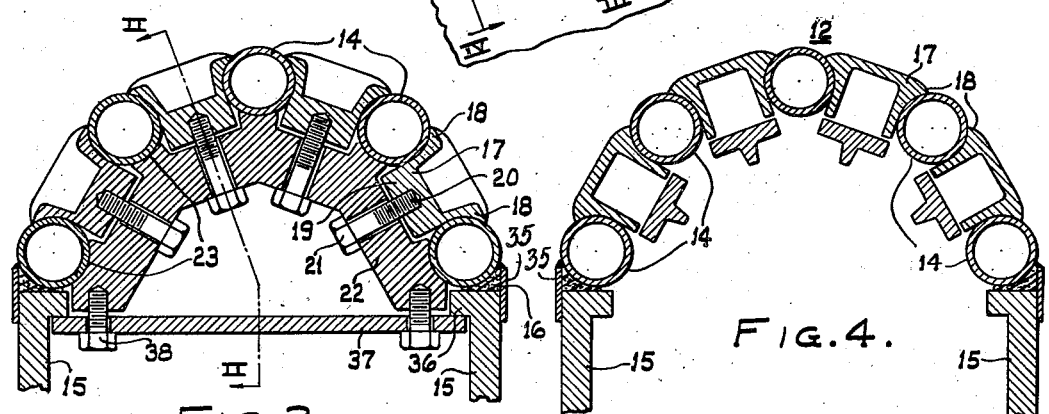
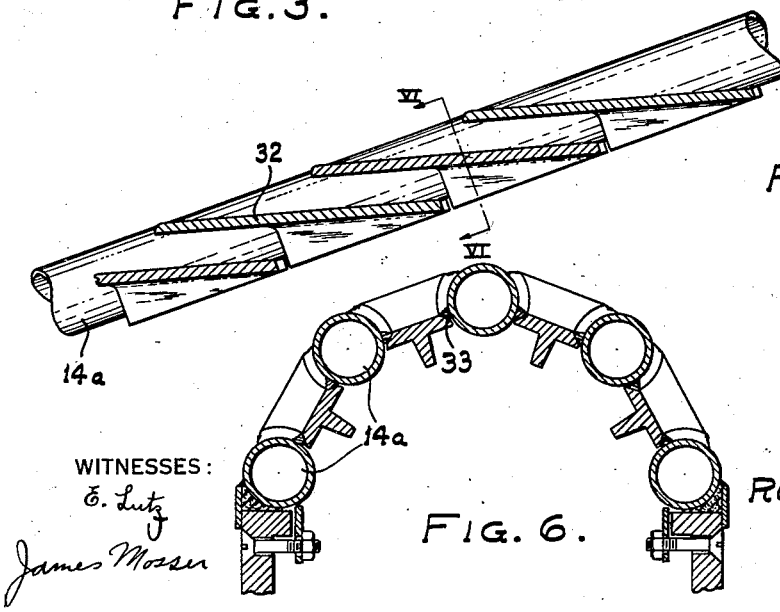

Aug. 17, 1937.   R. C. SHOCK   2,090,488
FLUID COOLED TUYÈRE CONSTRUCTION
Filed Aug. 4, 1934   5 Sheets-Sheet 3

WITNESSES:
E. Lutz
James Mosser

INVENTOR
ROLAND C. SHOCK.
BY a. B. Reeves
ATTORNEY

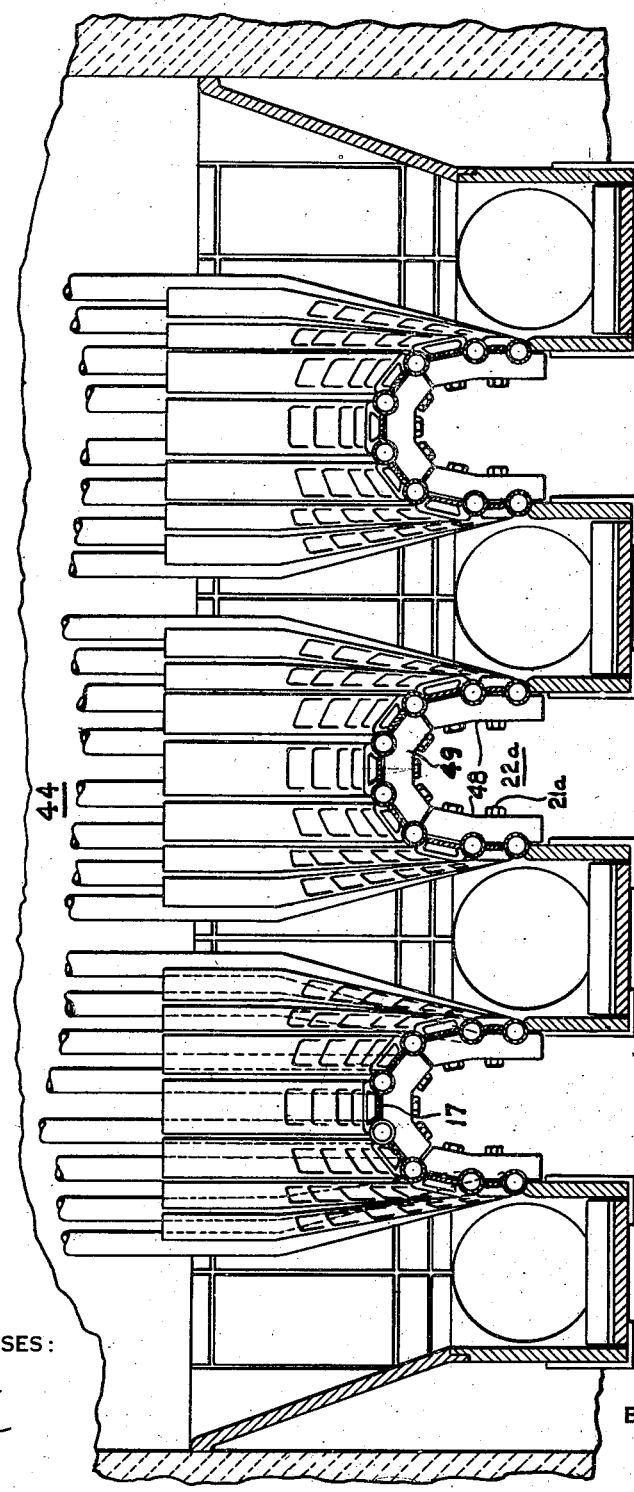

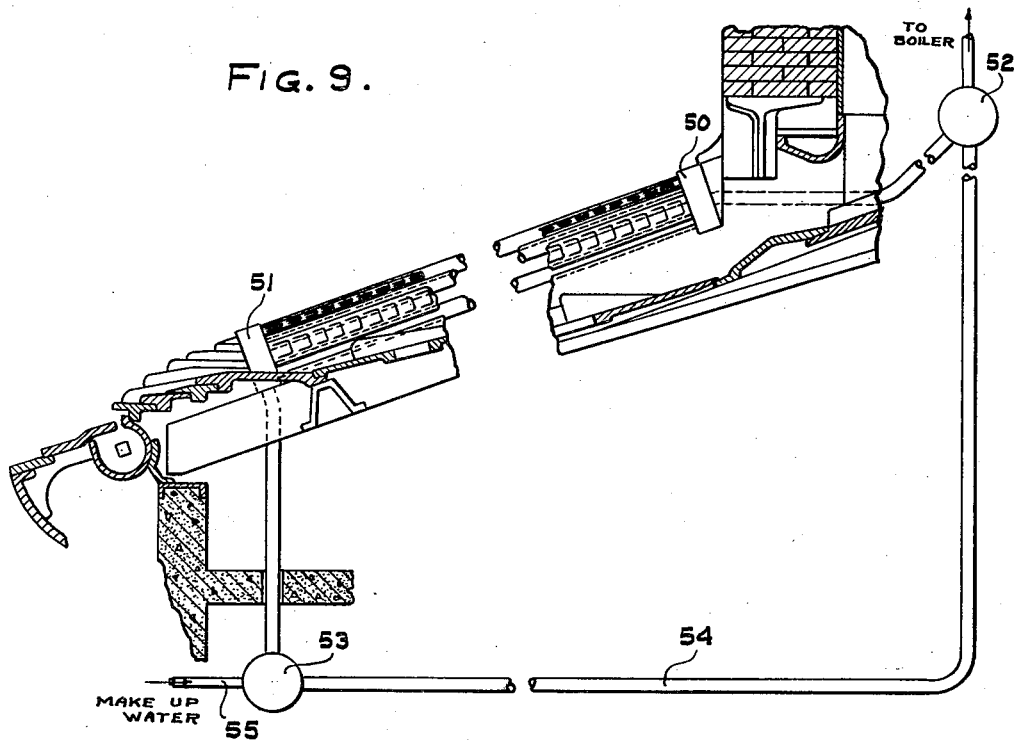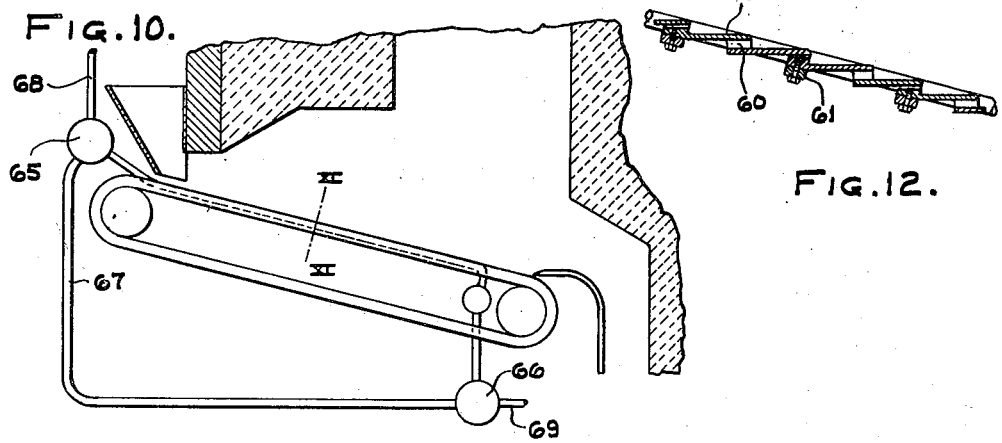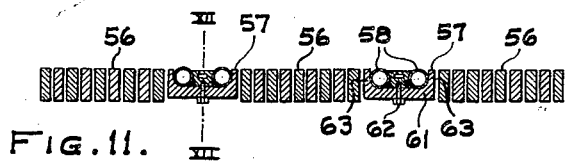

Patented Aug. 17, 1937

2,090,488

UNITED STATES PATENT OFFICE 2,090,488

FLUID COOLED TUYÈRE CONSTRUCTION

Roland C. Shock, Oregon Township, Lucas County, Ohio, assignor to Westinghouse Electric & Manufacturing Company, East Pittsburgh, Pa., a corporation of Pennsylvania Application August 4, 1934, Serial No. 738,515

12 Claims. (Cl. 122—4)

My invention relates to stokers and it has for an object to provide a fluid-cooled air admission or tuyère means therefor.

By providing the air admission means of a stoker, for example, the tuyères of an underfeed stoker, with fluid-cooled means, the service periods of boilers may be increased, the maintenance cost can be lowered, the air may be preheated to a higher point, and the cooling means may be so arranged as to provide a superheater or a reheater. If operated as a reheater, obviously the fluid may transfer heat indirectly, that is, some medium such as diphenoloxide may be circulated through the tubes and cause it to transfer heat to a second medium such as water or steam.

In the burning of low grade fuels of high sulphur content, of high iron content, and having a low ash fusion temperature, there has always been the difficulty of keeping control of the fuel bed over long periods of operation because of clinker formation, this condition of clinker formation being aggravated when preheated air is used. While preheated air is highly advantageous from a thermal point of view, in that it affords a convenient method of transferring heat from the stack to the combustion chamber, nevertheless it is accompanied by the objection that, as the air is ordinarily the sole cooling means for the tuyère castings, the latter are to the extent of the temperature of the preheat, brought that much nearer to the point of fusion of the ash. These conditions encourage a slow process of small particles of ash fusing to the iron, gradually building up a rough surface which interposes more and more resistance to fuel bed movement. In other cases, even though preheated air is not used, where the fuel has a high iron and sulphur content, and high ratings and thin fuel beds are involved, hot spots may occur which bring the ash temperature up to the fusion point, resulting in burning of the grates and destroying control of the fuel bed, the latter generally being followed by burned stoker iron or castings. If the surfaces contacting with the fuel bed are fluid-cooled, a much higher rate of heat transfer occurs and this will prevent burning by keeping the ash temperature below the fusion point and a smooth surface will be maintained for movement of the fuel bed. Aside from this advantage, cooling of the grate surface facilitates the use of preheated air and makes possible going to higher preheat temperatures. Furthermore, the fluid-cooled tuyère arrangement is advantageous when banking for the reason that the coke bed tends to remain longer on the fuel supporting surface than it would on an uncooled surface. Accordingly, a further and more specific object of my invention is to provide tuyère constructions bridging the spaces between adjacent walls of adjacent retorts of an underfed stoker and comprised by a group of tubes extending parallel to the retorts and spaced and supported by suitable structures forming tuyère passages.

These and other objects are effected by my invention as will be apparent from the following description and claims taken in connection with the accompanying drawings forming a part of this application, in which:

Fig. 2 is a sectional view taken along the line II—II of Fig. 3 and showing tuyère elements;

Fig. 3 is a sectional detail view taken along the line III—III of Fig. 2;

Fig. 4 is a sectional view taken along the line IV—IV of Fig. 2;

Fig. 5 is a sectional detail view, similar to Fig. 2 and showing tuyères of the second embodiment shown in Figs. 7 and 8;

Fig. 6 is a sectional view taken along line VI—VI of Fig. 5;

Fig. 8 is a sectional view taken along the line VIII—VIII of Fig. 7;

Fig. 9 shows a further embodiment of my invention;

Fig. 10 is a diagrammatic illustration of a chain grade stoker having my improvement applied thereto;

Fig. 11 is a sectional view, drawn to slightly enlarged scale and taken on the line XI—XI of Fig. 10; and, Fig. 12 is a detail sectional view taken along the line XII—XII of Fig. 11.

Figure 1:
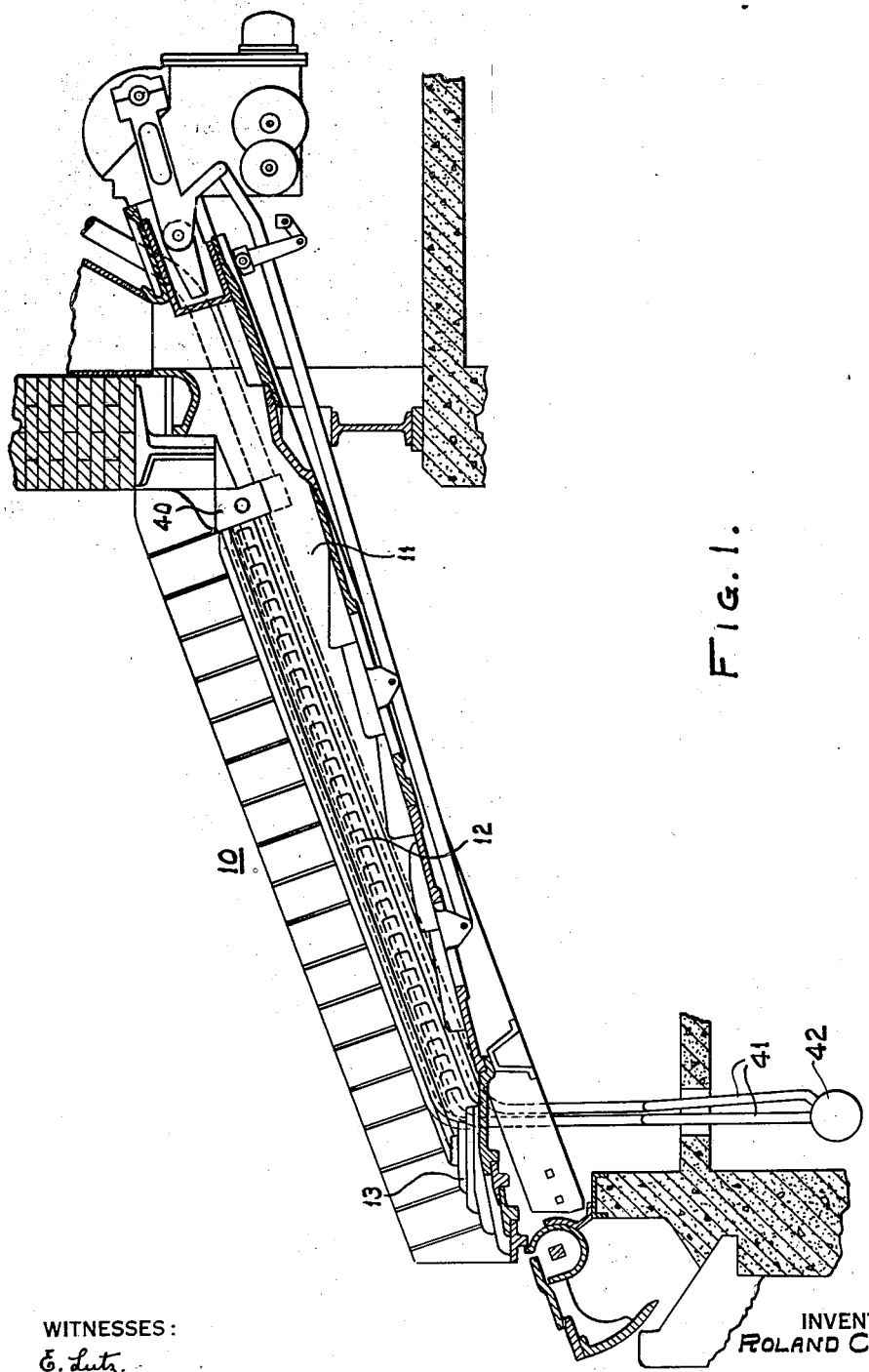
Fig. 1 is a longitudinal sectional view of a stoker showing my improved tuyère construction applied thereto.

Referring now to the drawings more in detail, I show an underfeed stoker of conventional type, at 10, including alternate retorts 11 and improved tuyère rows or constructions 12, it being understood that air for supporting combustion is admitted through the tuyère constructions from the space below the stoker to the fuel bed. Each tuyère row may consist entirely or partly of the improved tuyère construction 12. As shown, each construction 12 comprises part of a row, preferably the forward part, the row being completed by tuyère plates 13 of the conventional type.

Instead of having the tuyère rows constituted in the ordinary way entirely by stepped arrangements of cast iron plates bridging the spaces between adjacent side walls of adjacent retorts, I provide a novel type of tuyère construction for a part at least of the tuyère row length and comprised by arcuate groups of tubes 14 extending lengthwise of the stoker, there being an arcuate group extending over each space between adjacent sides of adjacent retorts. Accordingly, in the drawings, I show the adjacent side walls 15 of adjacent retorts bridged by arcuate groups of tubes 14. The tuyère construction is completed by means of tuyère plates arranged between adjacent tubes and connected thereto, the tuyère plates spacing the tubes; and, as they are connected to the tubes, the tubes and the plates constitute a rigid unitary tuyère construction.

Referring to Figs. 3 and 4, it will be seen that the marginal or bottom tubes 14 of the group do not rest directly on the retort side walls 15 but are preferably carried by asbestos cushions or packing 16 which is supported by the top edges of the retort side walls. Tuyère elements 17 are arranged in rows between adjacent tubes 14, such plates having unitary portions 18 which overlap the tubes to a suitable extent and the inner portions 19 of the plates are preferably tapped as shown at 20 for the reception of screws 21 which bear against the backing pieces or cast arches 22 having portions 23 fitting against the tubes. The backing pieces or arches are arranged at spaced intervals so that each tuyère element 17 may be firmly held in place. It will be apparent that, with tightening of the screws or bolts 21, the backing pieces or arches and the tuyère plates will be drawn together, thereby firmly gripping each tube 14 between the overlapping portions 18 of the tuyère plates and the curved seats 23 of the backing pieces or arches. Thus, it will be seen that the tubes 14 serve as structural members sustaining at least a portion of the fuel bed load or at least giving a self-supporting character to the tuyère construction and preferably directly contacting with the fuel bed.

As will be seen from Fig. 2, each tuyère element 17 includes plate portions 25 and 26 arranged in stepped, overlapped relation and spaced apart to provide air passages 27 and 28. Each passage 27 is enclosed in part by an extension 29 at the forward side of the adjacent arch 22, and each of the passages 28 is enclosed by a plate 26 and a forward extension 30 on the adjacent plate 25. As shown, each tuyère element 17 includes three plate portions, two portions 26 and a portion 25 arranged therebetween; however, it is to be understood that the tuyère elements may have any desired design or arrangement of parts so long as the relation thereof to the tubes and the capacity to furnish air and contribute to the self-supporting character of the tuyère construction are preserved.

As the tuyère elements 17 include relatively thin walls having substantial and intimate contact with the tubes 14, it will be apparent that good heat conductive paths are afforded to the medium passing through the tubes 14. Not only does flow of heat from the thin plates to medium passing through the tubes lower the temperature of ash adjacent to the tuyère plates, but the latter result is even better performed by having substantial portions of the tubes in direct contact with the fuel bed.

In Figs. 5 and 6, I show a further embodiment of my invention having unitary tuyère constructions each made up of arcuate groups of tubes with tuyère plates arranged between adjacent tubes in stepped and spaced relation and welded to the latter, spacing of the plates affording tuyère air passages. To this end, the groups of tubes 14a have steel plates 32 shaped so as to extend obliquely with respect to the tubes, fit the latter, and be welded thereto, welds being shown at 33. Here again, the space between adjacent tubes is not only used to provide structure which connects the tubes of a group together to form a unitary tuyère construction but also one which provides air passages between adjacent tubes for the passage of air from below the structure to the fuel bed to support combustion.

Each tuyère construction bridges the space between adjacent walls of adjacent retorts, and the tuyère constructions are preferably anchored to the retort side walls in such a way as to accommodate relative expansion and contraction. For example, in the first embodiment, shown in Figs. 1 to 4, inclusive, the bottom tubes of the tuyère construction have outer side plates 35 welded thereto and which extend downwardly and overlap the upper edges of the retort sides of the retort side walls 15, the plates serving to confine and retain suitable packing material, for example, asbestos packing 16, the packing serving as cushioning spacing means between the retort side walls and the bottom or supporting tubes of the tuyère constructions.

The cast arches 22 have their extremities arranged between and overlapping flanges 36 at the tops of the retort side walls 15. Anchor bars 37 are engaged beneath the flanges 36 and are connected to the cast arches 22 by means of screws 38. Preferably, the arches 22 are formed so that clearance exists with respect to the retort side wall flanges 36 and with respect to the anchor bars, whereby the tuyère construction may be fastened to secure the requisite tightness and so that the anchorage so afforded may permit of relative expansion and contraction of the retort side walls and of the tuyère construction.

Either the tuyère elements of Figs. 3 and 4 or those of Figs. 5 and 6 may be associated with the cooling tubes of the stoker organizations shown in Figs. 1, 7, 8, and 9.

In Fig. 1, the forward ends of the tubes of the tuyère constructions are connected to a header shown, for example, at 40; and the rearward ends of the tubes extend downwardly, as indicated at 41, and are connected to a header 42. The headers may be connected in the boiler circuit or in any suitable circuit which will supply fluid medium of satisfactory temperature to the tubes.

Figure 7:
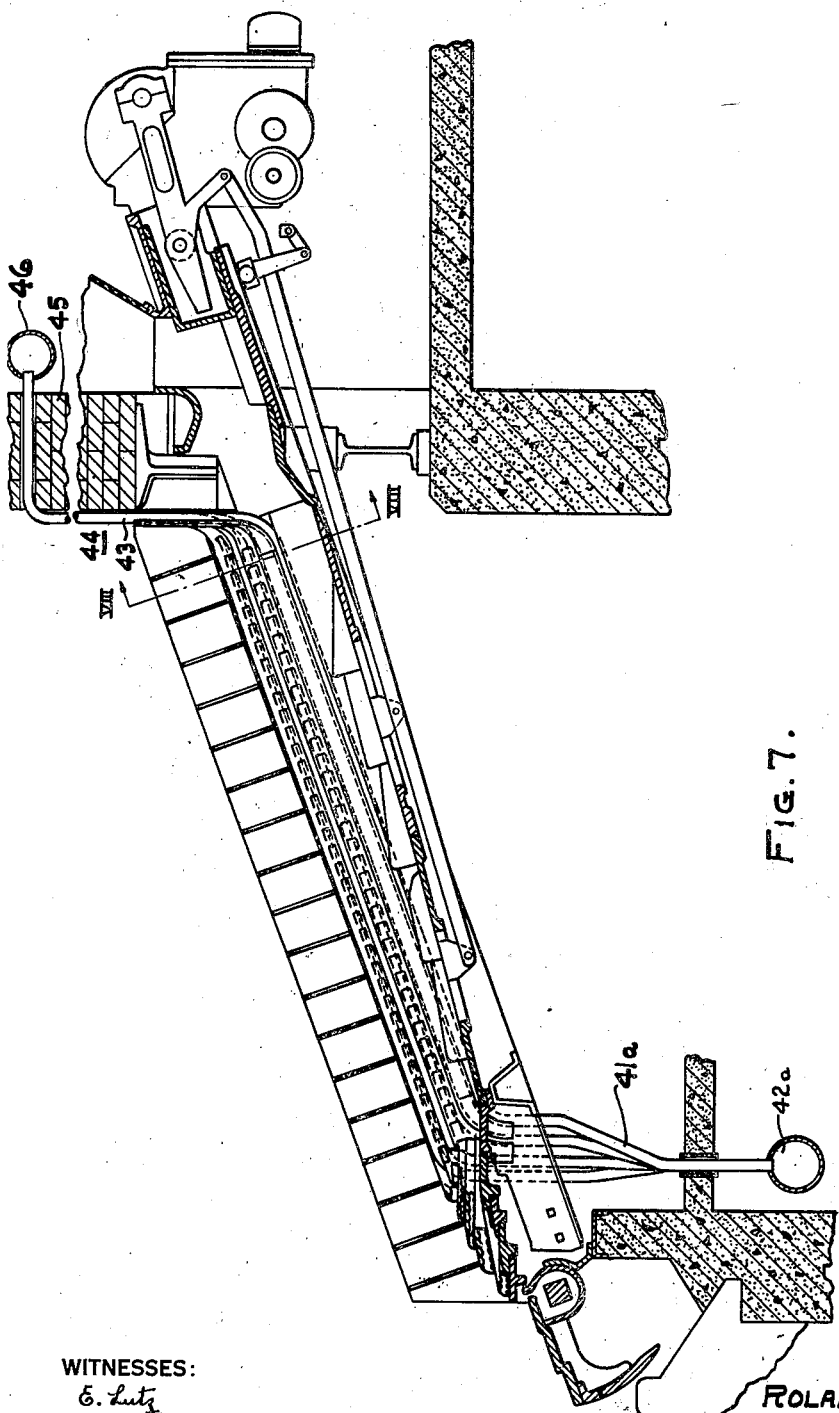
Fig. 7 is a longitudinal sectional view, similar to Fig. 1 and showing said second embodiment.

In Figs. 7 and 8, the form of construction illustrated is modified both with respect to the tuyère construction and with respect to connection of the tubes 14a to the headers. The tubes 14a, as in Fig. 1, extend downwardly at the rear, as shown at 41a, and are connected to a header 42a, but, at the forward ends, the tubes are bent upwardly, at 43, and such upwardly bent portions are splayed or spread outwardly to provide a front water wall, at 44. The tube portions 43 preferably extend through the furnace front wall 45 and are joined to a header 46 arranged externally of the latter.

The form of tuyère construction of Figs. 7 and 8 is shown as being provided with a larger number of tubes 14a, than the form shown in Figs. 1, 3, and 4, and arch constructions are employed, as shown at 22a in Fig. 8, divided into side pieces 48 and a top piece 49. As before, the tuyère elements 17 of Fig. 8 are connected to the arch portions 48 and 49 by means of bolts 21a. It will be obvious that the welded type of tuyère plate construction, shown in Figs. 5 and 6, may be used with the tuyère construction containing a relatively larger number of tubes, in which case, of course, there would be no necessity for arches, since the latter are not employed with the welded type of tuyère construction.

In Fig. 9, I show a form of tuyère construction which is connected to front and rear arrangements in such a manner that the tuyère constructions may be readily assembled and removed. To this end, the front ends of the tubes of each tuyère construction are connected to a header section 50 and the rear ends of the tubes are connected to a header section 51, the header sections 50 and 51 constituting end elements of the tuyère construction and being, respectively, joined to the headers 52 and 53. It will therefore, be apparent that, with separation of the header sections 50 and 51 from the adjacent headers 52 and 53, the tuyère constructions may be readily assembled or replaced. This form is advantageous in that each tuyère construction is provided with its header sections so that it may be more readily connected in and disconnected from a suitable cooling circuit.

While any suitable means may be employed to provide for the circulation of cooling medium in the tubes of the tuyère constructions and while any suitable cooling medium may be employed, I prefer to have the tubes of the tuyère constructions so related to the boiler that boiler water may be circulated therethrough. Although the tubes of the tuyère construction may, if desired, be arranged in series with the main boiler circuit, I prefer, in order to keep the tube sizes, particularly the inlet and outlet tubing for the tuyère constructions as well as the tubing of the latter, of a minimum size, to recirculate water through the tubes of the tuyère constructions, only such water being added to the recirculating circuit as to make up for steam generated in the tuyère construction tubes and separated and discharged from a high point in the recirculation circuit. To this end, in Fig. 9, I show the header 52, arranged above the front end of the tuyère construction, connected by a return tube 54 to the lower header 53, the latter having a make-up connection 55, it being understood that this means for securing recirculation is shown merely by way of example, it being obvious that the tubes of the tuyère constructions may be related to the boiler in any suitable manner to afford recirculation.

In Figs. 10, 11, and 12, I show my invention applied to a chain grate type of stoker preferably having a fuel-supporting surface inclined in the direction of fuel feed, the grate including a multiplicity of spaced chain grate elements 56, for moving the fuel bed progressively, with tuyère constructions 57 disposed between adjacent grate elements. Each tuyère construction embodies a group of tubes 58 with tuyère plates 59 disposed laterally of the tubes and in good heat-conductive relation with respect thereto, the tuyère plates 59, not only providing tuyère passages 60, but, as heretofore described, such plates, as well as the tubes 58, have upper portions in direct contact with the fuel bed to provide the fuel-supporting surface of the tuyère construction. The tuyère plates 59 may be connected or joined to the tubes 58 in any suitable manner, so long as good heat-conductive connections are provided.

In Figs. 11 and 12, I show spaced backing pieces 61 connected to the tuyère plates by screws 62, the spacing being such as to allow access of air from below to the tuyère passages and the ends of the backing pieces cooperating with side elements 63 which serve as guides for the chain grates 56 and minimize leakage space with respect to the latter. The front or upper ends of the tubes 58 are preferably connected to an upper header 65 and the lower ends of the tubes are connected to a lower header 66. A tube 67 provides for return of liquid from the upper header 65 to the lower header 66, the upper header being provided with a steam outlet connection 68 and the lower header having a make-up connection 69, whereby a recirculation circuit is provided for the tubes of the tuyère constructions.

From the structure described, it will be apparent that I have devised a tuyère construction made up of tubes and tuyère plates of unitary character and adapted to replace rows of stacked tuyère plates of ordinary construction. With the ordinary cast iron type of tuyère, there is a gradual retardation of the fuel bed movement caused by ash fusing to the roughened, burned cast iron. This causes more ash to be retained on the grate and the consequent building up of more clinker, the tendency toward clinker formation being increased as the ash fusion temperature is lowered. Fuel retardation does not occur at the same rate over the entire grate surface in consequence of which the fuel bed is disturbed or rendered irregular, resulting in excess air being admitted at certain points and too little air and consequent retardation of the combustion at others. Where excess air enters, a blow torch effect results, causing fine fuel material to be carried through the first row of boiler tubes while still ignited, inducing slagging of the boiler tubes or the material may be carried through the stack. Building up of fused ash on the grate causes clinkers and may retard movement of the fuel on the grate surface to such an extent as to expose metal, whereupon burning of the latter takes place. On the other hand with my improved fluid-cooled tuyère construction, the metal is maintained below the fusing temperature, thus preventing irregularities in fuel bed movement and building up of clinker formations as just pointed out. Furthermore, my improved tuyère construction is advantageous when banking a boiler for the reason that the coke bed will remain intact for long periods over the water-cooled surface, thereby giving a full fuel bed for starting. On the other hand, with the standard cast iron tuyère construction, when banking, the fuel is burned away in an irregular way, thereby leaving a bad condition thereof for starting, and this irregular fuel bed formation necessitates longer starting time in order to pick up load because the fuel bed must first be properly built up. The improved tuyère construction permits of operation of the stoker with preheated air heated to a higher temperature for the reason that the cooling medium passing through the tubes conducts heat away from the metallic parts preventing the latter from attaining such a high temperature as to result in the undesired conditions pointed out. The type of tuyère construction having plates welded between the tubes of each group is advantageous from the points of view of fabrication, design, and operation. The tubes and plates constitute a single autogenously connected structure providing good conductive paths from all metallic parts to the cooling medium passing through the tubes. Furthermore, the plates may be disposed and spaced so as to get tuyère passages of desired flow areas, such passages being made uniform from end to end or they may be differently dimensioned as desired depending upon the operating conditions.

While I have shown my improved tuyère construction as applied to an underfeed stoker, it will be apparent that the improvement may be applied to advantage wherever a tuyère construction is used to supply combustion air to a fuel bed, since the general objective is to cool the metallic parts providing the tuyère passages, this result being secured by tubes intimately associated with the metallic parts and forming the tuyère passages, the tubes also preferably contacting with the fuel bed or at least serving as structural members to give to the tuyère construction a self-supporting character, it being obvious that the latter characteristic follows from the mutual cooperation of the tubes and the tuyère plates, for, not only are the tubes spaced and supported by the tuyère plates, but the tubes carry the plates and serve as structural members in giving form and unity to the tuyère construction.

While I have shown my invention in several forms, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

What I claim is:

1. In a stoker, a plurality of devices for progressively moving a fuel bed, a tuyère construction arranged between adjacent devices, each tuyère construction including a group of laterally spaced metallic tubes extending lengthwise of the stoker, separate rows of metallic overlapping tuyère plates arranged in the spaces between tubes and engaging the latter laterally so as to expose upper portions of the tubes and the plates in order that such portions may jointly constitute the fuel-contacting surface of the construction, means for maintaining the tuyère plates in lateral engagement with the tubes so that the tubes and the tuyère plates mutually and dependently cooperate to provide a unitary and self-supporting tuyère construction, said overlapping tuyère plates being constructed and arranged to provide tuyère air passages between adjacent tubes, and means providing for circulation of cooling fluid through the tubes.

2. The combination as claimed in claim 1 wherein the tuyère passages are provided by passages formed in the plates and by passages each partly formed in adjacent plates.

3. In a stoker having a furnace chamber provided with a front wall, a plurality of devices for imparting movement to the fuel bed, said devices contributing to the support of the fuel bed and being arranged in spaced parallel relation in the direction of fuel bed movement, a tuyère construction between adjacent devices and comprised by a plurality of tubes with metallic elements connected thereto and carried thereby and arranged to provide tuyère passages, the forward ends of said tubes being bent upwardly and spread to provide a front water wall construction for the furnace front wall, and the tuyère construction portions of said tubes having the upper sides thereof directly contacting with the fuel bed so as to function as a part of the fuel supporting surface, and means providing for the circulation of cooling medium through the tuyère construction portions of said tubes and then through the front wall portions thereof, said metallic elements having intimate heat conductive relation with respect to the tubes, whereby the attainment of excessive temperatures by the metallic elements is minimized.

4. In an underfeed stoker of the multiple retort type, tuyère constructions bridging the spaces between adjacent retorts, each tuyère construction including a group of metallic tubes extending lengthwise of the stoker and metallic means for holding the tubes of a group together as a unit and in spaced relation, said metallic means being constructed and arranged to expose upper portions of the tubes so that the latter constitute parts of the fuel-supporting surface and said metallic means including portions extending between and in intimate heat conductive relation with respect to adjacent tubes and defining tuyère passages for the admission of combustion air to the fuel bed, and means providing for the passage of cooling medium through the tubes.

5. In an underfeed stoker of the multiple re-retort type, tuyère constructions bridging the spaces between adjacent retorts, each tuyère construction including an arcuate group of metallic tubes extending lengthwise of the stoker and metallic means for holding the tubes of a group together as a unit and in spaced relation so as to expose upper portions of the tubes in order that the latter may constitute parts of the fuel-supporting surface, said metallic means including portions extending between and in intimate heat conductive relation with respect to adjacent tubes and defining tuyère passages for the admission of combustion air to the fuel bed, and means providing for passage of cooling medium through the tubes.

6. In an underfeed stoker of the multiple retort type, tuyère constructions bridging the spaces between adjacent retorts, each tuyère construction including a group of metallic tubes extending lengthwise of the stoker and metallic means for holding the tubes of a group together as a unit and in spaced relation, said metallic means including portions extending between and in intimate heat contact with adjacent tubes to define tuyère passages for the admission of combustion air to the fuel bed and said portions being constructed and arranged to expose upper portions of the tubes so that the latter constitute parts of the fuel supporting surface, means for connecting each tuyère construction to adjacent side walls of adjacent retorts, and means providing for passage of cooling medium through the tubes.

7. In an underfeed stoker, a plurality of longitudinally-extending retorts, said retorts being spaced apart to provide for the passage of air therebetween and each retort having a pair of parallel side walls, tuyère constructions bridging the spaces between adjacent retorts and carried by the adjacent side walls of adjacent retorts, each tuyère construction including a group of longitudinally-extending metallic tubes arranged in arcuate formation, metallic means for holding the tubes of each group together as a unit and including portions extending between adjacent tubes to provide tuyère passages for admitting combustion air to the fuel bed, said portions being arranged in good heat conductive relation with respect to the tubes and exposing upper portions of the tubes so that such upper portions constitute parts of the fuel supporting surface, means for positioning the tuyère constructions on the retort side walls, and means providing for passage of cooling medium through the tubes.

8. The combination with means providing a furnace chamber having a front wall, of an underfeed stoker of the inclined multiple retort type arranged in said chamber, inclined tuyère constructions bridging the spaces between adjacent retorts, each tuyère construction embodying a group of metallic tubes extending longitudinally of the stoker and forming a part of the fuel supporting surface and metallic tuyère plates in intimate contact with the tubes and providing tuyère air passages, the groups of tubes at the front end being bent upwardly and spread to define a front tubular wall, and means providing for circulation of cooling medium upwardly through the tuyère construction portions of the tubes and then through the front tubular wall portions thereof.

9. In an underfeed stoker of the multiple retort type, tuyère constructions bridging the spaces between adjacent retorts, each tuyère construction including a plurality of spaced metallic tubes arranged parallel to the retorts, structurally separate metallic means arranged in the spaces between adjacent tubes, means for maintaining the metallic means in lateral engagement with the tubes so that the tubes and the metallic means mutually and dependently cooperate to provide a unitary and self-supporting tuyère construction with the tubes and the metallic means in good heat-conductive relation and with the upper portions of the tubes exposed so that the tubes and the metallic means jointly constitute the fuel contacting surface of the construction, said metallic means providing tuyère passages for the admission of combustion air to the fuel bed, and means providing for circulation of cooling fluid through the tubes.

10. In an underfeed stoker of the multiple retort type, tuyère constructions bridging the spaces between adjacent retorts, each tuyère construction including a group of spaced metallic tubes extending longitudinally of the stoker, metallic plates extending obliquely in the spaces between the tubes and arranged to expose the upper portions of the latter in order that such portions and the plates may constitute the fuel-contacting surface of the construction, the plates in the respective spaces being structurally separate, means for maintaining the plates in lateral and good heat-conductive engagement with the tubes so that the latter cooperate mutually and independently with the plates to provide a unitary and self-supporting tuyère construction, said plates being constructed and arranged to provide tuyère air passages, and means providing for circulation of cooling medium through the tubes.

11. In an underfeed stoker of the multiple retort type, tuyère constructions bridging the spaces between adjacent retorts, each tuyère construction including a group of spaced metallic tubes disposed transversely in arcuate formation and extending longitudinally of the stoker, metallic plates arranged in overlapping relation in the spaces between the tubes so as to expose the upper portions of the latter in order that such upper portions and the tubes may constitute the fuel-contacting surface of the construction, the plates in the respective spaces being structurally separate, means for maintaining the plates in lateral and good heat-conductive engagement with the tubes so that the latter and the plates mutually and dependently cooperate to provide a unitary and self-supporting tuyère construction, and means providing for the circulation of cooling medium through the tubes.

12. In a stoker, a plurality of spaced devices for progressively moving a fuel bed; a tuyère construction arranged between adjacent devices and including a group of laterally spaced metallic tubes extending lengthwise of the stoker, separate rows of overlapping metallic plates arranged in the spaces between tubes and providing air passages, said plates being welded to tubes laterally of the latter to expose upper portions thereof in order that the fuel-supporting surface of the tuyère construction may be provided jointly by the tubes and by the plates, the tubes and the plates mutually and dependently cooperating to provide a unitary and self-supporting tuyère construction; and means providing for circulation of cooling fluid through the tubes.

ROLAND C. SHOCK.

CERTIFICATE OF CORRECTION.

Patent No. 2,090,488.                               August 17, 1937.

ROLAND C. SHOCK.

It is hereby certified that error appears in the printed specification of the above numbered patent requiring correction as follows: Page 4, first column, line 48, claim 1, after "tubes" strike out the words "and the plates" and insert the same after "portions", line 49, same claim; page 5, second column, line 8-9, claim 10, for "independently" read dependently; and that the said Letters Patent should be read with these corrections therein that the same may conform to the record of the case in the Patent Office.

Signed and sealed this 19th day of October, A. D. 1937.

Henry Van Arsdale.
(Seal)                              Acting Commissioner of Patents.